United States Patent [19]

Boehner

[11] Patent Number: 4,715,035
[45] Date of Patent: Dec. 22, 1987

[54] METHOD FOR THE SIMULATION OF AN ERROR IN A LOGIC CIRCUIT AND A CIRCUIT ARRANGEMENT FOR IMPLEMENTATION OF THE METHOD

[75] Inventor: Michael Boehner, Neubiberg, Fed. Rep. of Germany

[73] Assignee: Siemens Aktiengesellschaft, Berlin and Munich, Fed. Rep. of Germany

[21] Appl. No.: 852,661

[22] Filed: Apr. 16, 1986

[30] Foreign Application Priority Data

May 31, 1985 [DE] Fed. Rep. of Germany ....... 3519606

[51] Int. Cl.⁴ ...................... G06F 11/22; G01R 31/28
[52] U.S. Cl. ........................................ 371/23; 371/25; 364/578
[58] Field of Search ................. 371/23, 25; 324/73 R; 364/578

[56] References Cited

U.S. PATENT DOCUMENTS

| | | | |
|---|---|---|---|
| 3,633,100 | 1/1972 | Heilweil et al. | 324/73 R |
| 3,755,598 | 11/1973 | Chao et al. | 371/23 |
| 3,780,277 | 12/1973 | Armstrong et al. | 371/23 |
| 4,228,537 | 10/1980 | Henckels et al. | 371/23 |
| 4,308,616 | 12/1981 | Timoc | 371/23 |
| 4,527,249 | 7/1985 | Van Brunt | 364/578 |

OTHER PUBLICATIONS

Z. Barzilai et al., Fault Simulation for Pass Transistor Circuits Using Logic Simulation Machines, IBM Tech. Discl. Bulletin, vol. 27, No. 5, Oct. 1984, pp. 2861-2864.
J. Hlavicka et al., Fault Model for TTL Circuits, Digital Processes, vol. 2, No. 3, Autumn 1976, pp. 169-180.

Primary Examiner—Charles E. Atkinson
Attorney, Agent, or Firm—Hill, Van Santen, Steadman & Simpson

[57] ABSTRACT

A method for the simulation of an error in a logic circuit which comprises a bus optionally connectible to different logic levels, utilizes the assistance of input bit patterns from which output bit patterns are derived via a simulation model containing the error, these output bit patterns being compared to reference bit patterns which are valid for error-free operation. The object is a reliable recognition of an error which leads to a bus conflict, by applying different logic levels to the same circuit mode, by way of an output bit pattern which deviates from a reference bit pattern. This is achieved in that the bus, including the switch elements connecting the levels, is modeled by gate functions, whereby the undefined bus level given simultaneous connection of different logical levels is imaged into a logical "0" by a first bus model version and is imaged into a "1" by a second bus model version. Both bus model versions are respectively utilized in one segment of the simulation method.

17 Claims, 16 Drawing Figures

| 20 | 21 | 22(23a) | 22(23b) |
|---|---|---|---|
| 1 | 1 | 0 | 1 |
| 0 | 1 | 0 | 0 |
| 1 | 0 | 1 | 1 |

FIG 6 
AND GATE WITH INVERTING INPUT

FIG 7 
BUS MODEL (LOW IMPEDANCE)

FIG 8 
INVERTER
LOW IMPEDANCE BUS MODEL

FIG 9 
BUS MODEL
NAND GATE WITH INVERTING INPUT

FIG 10 
INVERTERS
AND GATES
OR GATES

METHOD FOR THE SIMULATION OF AN ERROR IN A LOGIC CIRCUIT AND A CIRCUIT ARRANGEMENT FOR IMPLEMENTATION OF THE METHOD

BACKGROUND OF THE INVENTION

Field of the Invention

The present invention relates to a method for the simulation of an error in a logic circuit which is designed for the optional connection of two logical levels to a circuit node via at least two input circuits which are provided with switch elements, wherein output bit patterns are derived from input bit patterns via a simulation model containing the error, the output bit patterns to be compared to reference bit patterns which are valid for an error-free case, and to circuit arrangements for implementing the method.

SUMMARY OF THE INVENTION

The object of the invention is to provide a method which is suitable for finding input bit patterns which lead to the reliable discovery of a specific error, the errors being discovered with the assistance of a simulation model of the logic circuit. This is the case when, given the presence of this error, the input bit patterns produce output bit patterns which differ from reference bit patterns on the basis of at least one bit. The error to be found should thereby cause two switch elements contained in the logic circuit to simultaneously supply a common circuit node with two different logic levels, whereby the application of a logic level which is completely undefined in this regard to the common circuit node can also be referred to as a bus conflict. The object, therefore, is to find bit patterns which also permit reliable identification of a simulated error leading to bus conflict despite the undefined logic state which arises on the bus, i.e. which produces output bit patterns which clearly differ from the reference bit patterns in at least one bit.

The above object is achieved, according to the present invention, and in a method of the type initially and generally set forth above, in which the method is particularly characterized in that, for simulation of a faulty, simultaneous connection of both logic levels in a first method step, a simulation model having a first bus model version is employed, this imaging the resulting, undefined bus level onto the first logical level; and in that, in a second method segment, the same simulation model is employed, however with a second bus model version replacing the first bus model version which images the resulting, undefined bus level onto the second logic level.

The advantage attained with the method of the present invention is that, in particular, even given a simulation of errors leading to bus conflicts, defined statements as to their recognizability by input bit patterns can be made.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
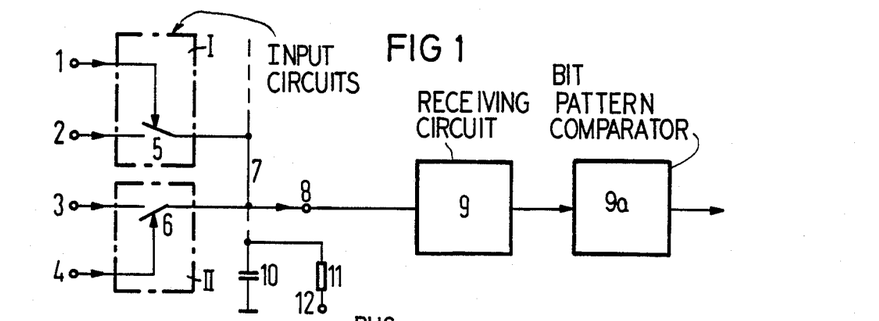
FIG. 1 is a schematic equivalent circuit diagram of a portion of a logic circuit comprising a bus and two input circuits.

A logic circuit from which the present invention proceeds contains a subcircuit which can be described by the equivalent circuit diagram of FIG. 1. In this circuit there are two or more input circuits, for example I and II, which are composed of respective switches 5 and 6 in the most simple case. Of these, the switch 5 or, respectively, the switch 6 is selectable by way of an input 1, for example, so that given the application of a logical "1", the logic level which is present at the input 2 is connected through to the common circuit node or bus 7. In an analogous manner, the switch 6 is selected by way of an input 4 that, given application of a logical "1", it connects the logic level present at the input 3 through to the bus 7. As a result of a logical "0" at the inputs 1 and 4, the logic levels are disconnected from the bus 7. The bus 7 comprises an output 8. The inputs 1-4 are generally preceded by further portions of the logic circuit and the output 8 is followed by further portions of the logic circuit.

Given the assumption that a respective logical "1" is applied to the inputs 1 and 2, whereas the inputs 3 and 4 are respectively charged with a logical "0", the bus 7 lies at the logical level "1". When, however, a hold error with the logical level "1" (stuck at "1") is present at the input 4 which causes a logical level "1" constantly at the input 4, then the faulty pattern "1101" lies at the inputs 1-4 instead of the aforementioned pattern "1100". The level "0" is thereby transmitted via the switch 6 from the input 3 to the bus 7, even though the bus 7 is simultaneously experiencing a logical level "1" via the switch 5. A bus conflict therefore arises. The bus level thereby resulting is tapped by way of a comparator circuit 9a connected to the output 8. In a realization of the logic circuit, a level dependent on the no-load voltages and internal resistances of the two voltages sources connected to the inputs 2 and 3, as well as on the load resistor at the bus 7, occurs in the case of a bus conflict at the bus 7. The receiving circuit 9 which is provided with a threshold then interprets this level as a logical "1" when the threshold is exceeded or, respectively, interprets the level as a logical "0" when the threshold is not exceeded. Without an accurate knowledge of the circuit parameters, however, the level at the bus 7 resulting in the case of a bus conflict cannot be predicted but, rather, must be accepted as undefined.

A stuck at "1" error at the input 4 which, as set forth, leads to a faulty input pattern of "1101" at the inputs 1-4 can only be discovered in that case wherein, in the simulation of the logic circuit, the undefined level at the bus 7 caused by the bus conflict is imaged onto a logical "0" by the receiving circuit 9 at the output 8. Since the fault output signal would be a logical "1" in accordance with the error-free input signal pattern "1100", the error is thereby obvious. If, on the other hand, the undefined level at the bus 7 were imaged by the receiving circuit 9 into a logical "1" at the output 8, the error could not be detected since, of course, the corrected output level would be simulated despite the error at the output 8 leading to a bus conflict.

In comparison thereto, given a faulty input pattern of "1011" at the inputs 1-4 (with the stuck at "1" error at the input 4), the error leading to the same bus conflict can only be detected if the undefined level at the bus 7 in the simulation were imaged into a logical "1" by the comparator 9a at the output 8 by way of the receiving circuit 9, but could not be detected when the simulation of the logic circuit yields a logical "0" at the output 8 in this case.

When the logical level which may be tapped at the output 8 and onto which an undefined bus level produced by a bus conflict is imaged is not established from the very outset in a physical circuit realization of the simulation model, then the error to be found can be detectable either given the appearance of the one or given the appearance of the other of the two faulty input patterns "1101" or "1011". In the simulation at the inputs 2 and 3, therefore, both input patterns "1,0" and "0,1" must be taken into consideration.

Figure 2:
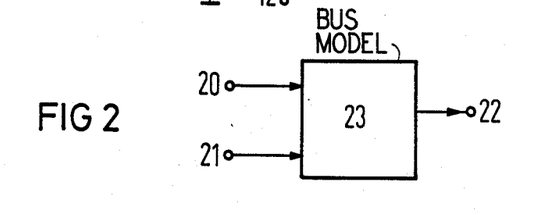
FIG. 2 is a block circuit diagram of a bus model.
Figure 3:
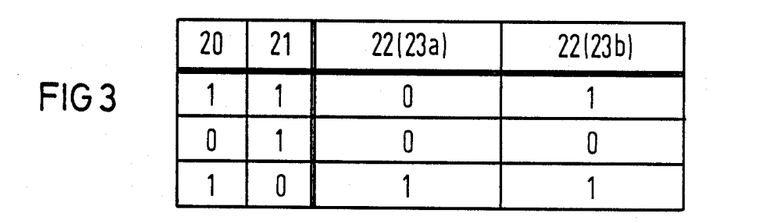
FIG. 3 is a function table for the bus model of FIG. 2.

In accordance with the invention, therefore, one proceeds such that a bus model 23 describing the behavior of the bus 7 for both input patterns is produced for the case of the bus conflict. In accordance with the block circuit diagram of FIG. 2, this bus model comprises two inputs 20 and 21 and one output 22. A function table of the bus model 23 is illustrated in FIG. 3. Shown in the left third of the function table is that the input patterns "1,1"; "0,1" and "1,0" respectively come into consideration for the inputs 20 and 21. The input 20 is then supplied with a logical "1" when at least one of the input circuits, for example, I or II, connects a logical "1" through onto the bus 7. When this is not the case, then a logical "0" is supplied to the input 20. The input 21 is occupied with a logical "1" when at least one of the input circuits, for example II or I, connects a logical "0" through onto the bus 7. When this is not the case, then the input 21 is occupied with a logical "0". It therefore derives that the first line of a table in FIG. 3 having the input pattern "1,1" relates to the case of a bus conflict, whereas the lines 2 and 3 having the input patterns of "0,1" and "1,0" identify the normal operation in which an unequivocal datum arrives onto the bus. Deriving from the center third of the table is that the output signals "0", "0" and "1" are derivable in lines 1-3, whereas the output signals "1", "0" and "1" are derivable from the right third of the table. The output signals of the middle third are obtained by way of a first bus model version 23a; the output signals of the right third are acquired with the assistance of a second bus model version 23b.

Figure 4:
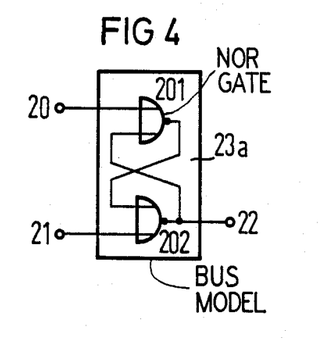
FIGS. 4-9 illustrate embodiments of the bus model which are constructed with logic gates.

FIG. 4 illustrates the first embodiment of the first bus model version 23a, which correspond to a high-impedance circuit technology, for example to a metal-oxide-semiconductor (MOS) technology. This embodiment is composed of a first NOR gate 201 and of a second NOR gate 202. The first input of the NOR gate 201 corresponds to the input 20 of the model 23a and the first input of the NOR gate 202 corresponds to the input 21, whereby the second inputs of both NOR gates are respectively connected to the output of the other gate. The output of the gate 202 simultaneously represents the output 22 of the model 23a.

Figure 5:
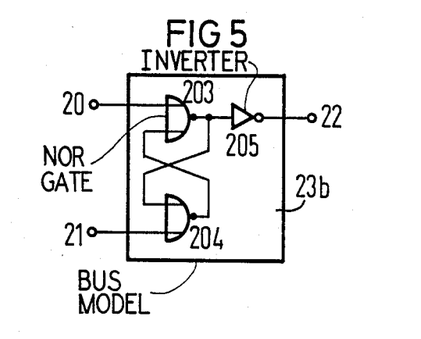

A first embodiment of the second bus model version 23b which corresponds to a high-impedance circuit technology is shown in FIG. 5. This again proceeds on the basis of two NOR gates 203 and 204 whose first inputs respectively correspond to the inputs 20 and 21. The second input of each of these NOR gates is again connected to the output of the respective other NOR gate. The output 203 is connected to the output 22 of the model 23b by way of an inverter 205.

In a realization of the logical subcircuit of FIG. 1 in a high-impedance circuit technology, for example in MOS technology, there is an additional condition for the bus model versions due to the negligible size of the conductance 11, this additional condition being that, given the application of the pattern "0,0" to the inputs 20, 21, i.e. given opening of all switch elements in the input circuits I and II, the level on the bus 7 should be maintained unaltered. The embodiments of the bus model versions of FIGS. 4 and 5 meet this condition.

Figures 6, 7:
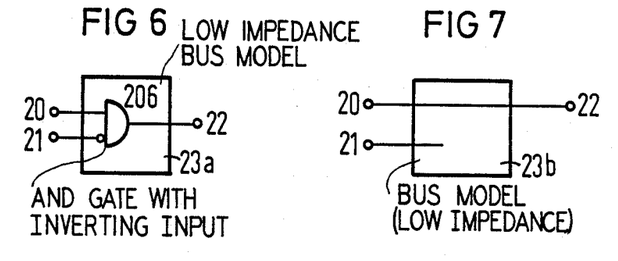

FIG. 6 illustrates a second embodiment of the first bus model version 23a which corresponds to a realization of the logical subcircuit of FIG. 1 in a low-impedance circuit technology. In this case, the conductance 11 of FIG. 1 is no longer negligible. The bus model version 23a is thereby composed of an AND gate 206 having a non-inverting input which corresponds to the input 20 and an inverting input which corresponds to the input 21. The output of the AND gate 206 simultaneously forms the output of the model 23a FIG. 7 illustrates the second bus model version 23b for a low-impedance circuit technology wherein the input 20 is directly connected to the output 22, whereas the input 21 is operated in no-load operation. Essential for the embodiments illustrated in FIGS. 6 and 7 is that, in addition to the conditions of the function table of FIG. 3, they respectively yield an output level "0" for the case of an input pattern of "0,0" this corresponding to that case in FIG. 1 in which the terminal 12 lies at the logical level "0" and, when all switch elements are opened, the bus 7 charges to this level via the conductance 11.

Figure 8:
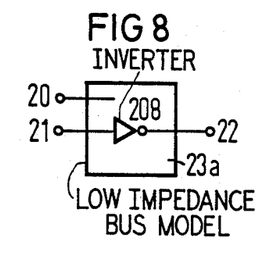
Figure 9:
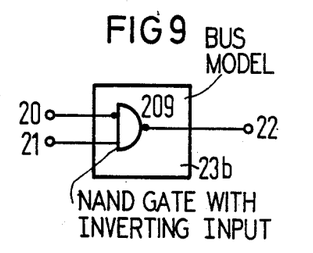

FIG. 8 illustrates a third embodiment of the first bus model version 23a which corresponds to a realization of the logical subcircuit of FIG. 1 in a low-impedance circuit technology. FIG. 9 illustrates a third embodiment of the second bus model version 23b for the same circuit technology. The first bus model version 23a in FIG. 8 is thereby composed of an inverter 208 connecting the input 21 to the output 22, whereas the input 20 is operated in no-load operation. FIG. 9 illustrates a second bus model version 23b which contains a NAND gate 209. An inverting input of the gate 209 forms the input 20; a non-inverting input of the gate forms the input 21. The output of the gate 209 represents the output 22. It is valid for the bus model versions of FIGS. 8 and 9 that, given an input pattern of "0,0", i.e. when all switch elements in FIG. 1 are opened, a level is established on the bus 7 which corresponds to a logical "1". Given the low impedance of the circuit, this is the case when a logical "1" is at the terminal 12, the bus 7 charges thereto via the conductance 11 when all input signals are disconnected.

Figure 10:
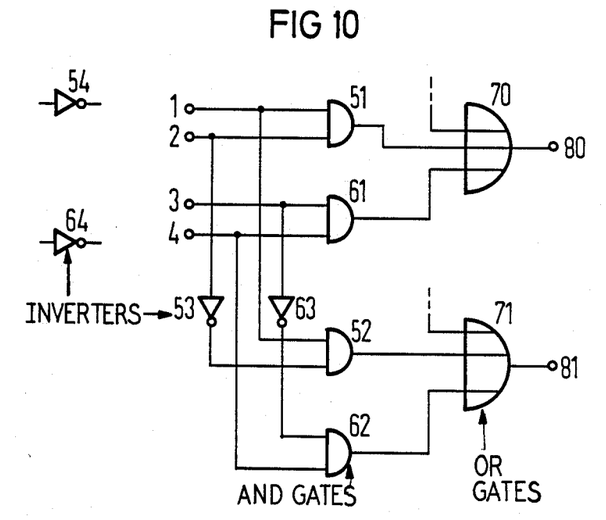
FIG. 10 is a model of the input circuit of FIG. 1 which is likewise constructed with logic gates.

FIG. 10 illustrates a model of the input circuits I and II of FIG. 1 which can precede the bus model 23. It can be seen that two AND gates 51 and 52 correspond to the switch element 5 of FIG. 1. As set forth, of course, a logical signal is applied to the input 2 of FIG. 1, and this logical signal can be optionally connected through onto the bus 7 by way of a logical signal at the input 1. In FIG. 10, these two logical signals are supplied to the inputs of the AND gate 51. Further, these two logical signals are applied to the inputs of the AND gate 52, but not until after previous inversion in an inverter 53 of the signal applied at the input 2. Analogously, the signals at the inputs 3 and 4 are directly supplied to the inputs of an AND gate 61 and, after preceding inversion of the signal at the input 3 in an inverter 63, are also supplied to the inputs of an AND gate 62. The outputs of the AND gates 51 and 61 are connected to the inputs of an OR gate 70 and the outputs of the AND gates 52 and 62 are connected to the inputs of an OR gate 71. Finally, the outputs 80 and 81 of the OR gates 70 and 71 are connected to the inputs 20 and 21 of the bus model 23.

It can be stated in very general terms for an arbitrary plurality of input circuits in FIG. 1 that all input signals, for example those at the inputs 2 and 3, are logically combined with the appertaining control signals, for example those at the inputs 1 and 4, being combined therewith in a respective AND gate, for example the AND gates 51 and 61. All outputs of these AND gates are combined in an OR gate, such as the OR gate 70. The output 80 supplies the input 20 of the bus model 23. All input signals, for example those of the inputs 2 and 3, are also inverted, for example in the inverters 53 and 63, and are combined with the appertaining control signals, for example those at the inputs 1 and 4, being combined therewith in a respective, further AND gate, for example the AND gates 52 and 62. All output of these AND gates are combined in the further OR gate 71. The output 81 thereof supplies the input 21 of the bus model 23.

It has been heretofore assumed that the switch elements, for example the switches 5 and 6, are through-connected with the logical level "1". When, in contrast thereto, they are through-connected with the logical level "0", then a respective inverter, for example the inverters 54 and 64, is to be provided in FIG. 10 in series with the control inputs, for example the inputs 1 and 4. Further, it has heretofore been assumed that the switch elements cause a through-connection of the level applied to the inputs, for example the inputs 2 and 3, to the bus 7 without inversion. When such an inversion occurs, then, departing from FIG. 10, the inverters 53 and 63 are not to be provided in the leads to the AND gates 52 and 62 but, rather, in the leads to the AND gates 51 and 61, whereby their disposition in series with the inputs 2 and 3 remains unaltered.

Figures 11, 12:
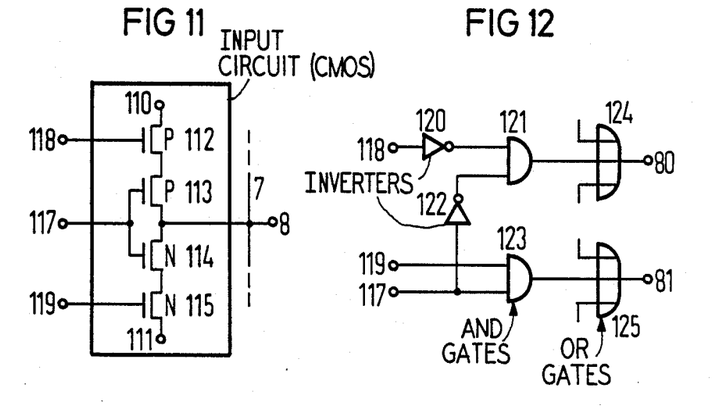
FIGS. 11-16 are further logic circuit diagrams of input circuits and their models constructed with logic gates.

FIG. 11 illustrates a complementary-metal-oxide-semiconductor (CMOS) associated input circuit which serves for optional connection of the logic signal applied to an input 117 to the bus 7 in inverted form. This input circuit, also referred to as a CMOS tri-state inverter, comprises the series connection two p-channel field effect transistors 112 and 113 and two n-channel field effect transistors 114 and 115 between two terminals 110 and 111 which are respectively connected with a supply voltage and a reference voltage. The gates of the transistors 113 and 114 are connected to the input 117, whereby the junction of the transistors 113 and 114 is connected to the bus 7. The output thereof is again referenced 8. The gate of the transistor 112 is connected to an input 118; the gate of the transistor 115 is connected to an input 119. Given the appearance of a logical "1" at the input 119, a logical "1" is connected from the input 117 onto the bus 7 as a logical "0". On the other hand, a logical "0" from the input 117 is connected onto the bus 7 as a logical "1" given the appearance of a logical "0" at the input 118.

When the rule set forth with reference to FIG. 10 are applied for modeling this input circuit, then a model in accordance with FIG. 12 derives. The input 118 is thereby connected via an inverter 120 to the first input of an AND gate 121. The input 117 is connected by way of an inverter 122 to the second input of the AND gate 121. On the other hand, the inputs 117 and 119 are connected to the inputs of an AND gate 123. The output of the AND gate 121 is connected to an input of an OR gate 124 whose other inputs, for example, are connected to outputs of corresponding AND gates of further, for example identical, input circuits. The output 80 of the gate 124 is then connected to the input 20 of the bus model 23. The output of the gate 123 is connected to the input of an OR gate 125 whose other inputs are connected to the outputs of corresponding AND gates of further, for example identical, input circuits. The output 81 of the gate 125 is connected to the input 21 of the bus model 23.

Figure 13:
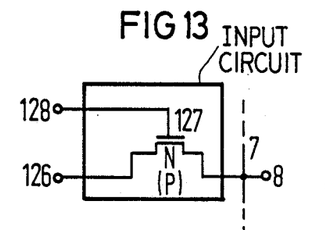
Figure 14:
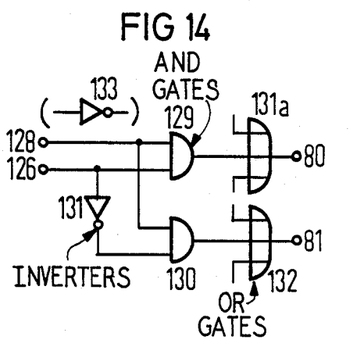

FIG. 13 illustrates an input circuit wherein the level applied to an input 126 is connected onto the bus 127 by way of an n-channel field effect transistor 127. The switching transistor 127 becomes conductive due to the application of a logical "1" to the input 128. The modeling of this circuit in accordance with FIG. 14 leads to two AND gates 129 and 130 of which the first is directly connected to the inputs 126 and 128, whereas the second is directly connected to the input 128 but is connected to the input 126 via an inverter 131. The outputs of the gates 129 and 130 are respectively connected to an input of two OR gates 131a and 132 whose outputs 80 and 81 are again connected to the inputs 20 and 21 of the bus model. Further inputs of the gates 131a and 132 are connected to the outputs of further AND gates which, corresponding to the AND gates 129 and 130, are allocated to further, for example identical, input circuits. Given realization of the input circuit with a p-channel field effect transistor 127, an inverter 133 is introduced into the model in series with the input 128, as indicated in FIG. 14.

Figures 15, 16:
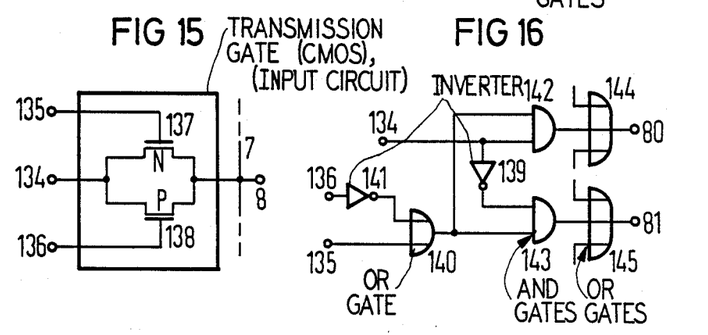

FIG. 15 illustrates a CMOS transmission gate as an input circuit wherein a logical level applied to the input 134 is connected through onto the bus 7 given the appearance of a logical "1" at the input 135 and/or given the appearance of a logical "0" at the input 136. A respective n-channel field effect transistor 137 and a p-channel field effect transistor 138 serve as switch elements, these having their switching paths respectively inserted between the input 134 and the bus 7. The gate of the transistor 137 is connected to the input 135; the gate of the transistor 138 is connected to the input 136.

In the modeling of this input circuit, a gate arrangement comprising two AND gates 141 and 142 derives in accordance with FIG. 16. The input 134 is directly connected to the first input of the gate 142 and is connected to the first input of the gate 143 by way of an inverter 139. The inputs 135 and 136 are connected to the inputs of an OR gate 140, whereby a further inverter 141 is inserted in series with the input 136. The output of the gate 140 is connected to be second inputs of the gates 142 and 143. The outputs of the gates 142 and 143 are connected to respective inputs of respective OR gates 144 and 145 whose outputs 80 and 81 are connected to the inputs 20, 21 of the bus model 23. The further inputs 144 and 145 indicated in FIG. 16 are connected to outputs of further AND gates which, in accordance with the gates 142 and 143, are allocated to further, for example identical, input circuits.

A logic circuit which contains a subcircuit of the type provided in FIG. 1 is to be subject to an error simulation and is first modeled. This occurs for the subcircuit of FIG. 1 in such a manner that the input circuits, for example I and II which effect a connection of the logical level onto a bus are simulated by gate functions which can be realized in accordance with one of the circuits of FIGS. 10, 12, 14 or 16. The bus, for example the bus 7, is simulated by the bus model which, in particular, can be realized by a series of gate functions in accordance with one of the circuits of FIGS. 4–6 or 9, or can be realized by more simple circuit functions in accordance with FIGS. 7 or 8. The connection of the aforementioned model portions occurs between the outputs 80, 81 and the inputs 20, 21. The modeling of the remaining circuit portions occurs in a manner known per se.

The method of the invention is then executed such that, in a first method step, a succession of N-place input patterns is applied to N inputs of the logic circuit in succession, whereby the bus model is first present in one of the embodiments of the first bus model version 23a. After traversing the circuit portions or, respectively, circuit functions which lie upstream of the inputs 1–4 or the corresponding inputs of further input circuits, each of these input bit patterns then yields logical signals which are supplied to these inputs.

Each of these signals which is suppose to be connected onto the bus via a switch arrangement present in an input circuit is thereby ANDED with the signal controlling the switch element. The AND-operated signals of all switch elements in the input circuits are subsequently ORED in a first gate, for example the gate 70. For every switch element, for example the switch elements 5 and 6, in the input circuits, additionally, the signal to be switched via the same is ANDED after preceding inversion, being ANDED with the signal controlling the appertaining switch element, whereby these AND-operated signals of all switch elements of the input circuits are combined in the manner of an OR gate in a second gate, for example the gate 71. The output signals of the first and second gates 70, 71 are then supplied to the first and second inputs 20, 21 of the first bus model version 23a which, as set forth, images a bit pattern sequence "11", "01" and "10" supplied to the inputs 70 and 71 onto the output signal sequence "0", "0", "1".

Upon application of the input pattern sequence, a sequence of output bit patterns appears at the outputs of the logical circuit. Given a faultlessly-modeled logical circuit, each of the output bit patterns represents a reference bit pattern which is assigned to a defined input bit pattern. When a circuit fault is then provided in the circuit portion lying upstream of the inputs 1–4, this causing a bus conflict with respect to the bus 7 and when, given a comparison of the individual output bit patterns then obtained to the corresponding reference bit patterns, an output bit pattern is then identified which deviates in at least one bit from the corresponding reference bit pattern, then the appertaining input bit pattern which produces the deviating output bit pattern given the presence of this error is also identified. When this input bit pattern is applied to a realized logic circuit corresponding to the modeled circuit, this realized logic circuit to be checked for errors, and when the deviating output bit pattern is also obtained thereat, then the simulated error is also present in the circuit to be checked.

In these simulation of errors which lead to a bus conflict, the error may not yet be perceivable in the first method segment under certain conditions. In order to suppress this uncertainty, a second method segment is also added wherein the second bus model version 23b is utilized instead of the first model, given a model which is otherwise unaltered. Advantageously, the same input bit pattern sequence is thereby applied to the N circuit inputs. In case a deviating output bit pattern was not obtained in the first method segment (but very frequently even given the presences of a deviating output bit pattern already identified in the first bit segment), an output bit pattern (or a further output bit pattern) which differs in at least one bit from the reference pattern is obtained in the second method segment. The appertaining input bit pattern can be supplied to a realized logic circuit corresponding to the model circuit, this realized logic circuit to be checked for errors. When the output bit pattern deviating from the reference bit pattern is thereby obtained, then the simulated error is also present in the circuit to be checked.

When the input bit patterns found in the two method segments, these leading to output bit patterns deviating from the reference bit patterns, are supplied to a logic circuit to be tested and when the appertaining, deviating output bit patterns are thereby obtained, then the simulated errors and pertaining to these deviating output bit patterns are present in the circuit to be checked.

The method execution set forth above applies in that case when the signals to be switched onto the bus via the switch elements, for example 5 and 6, in the input circuits, for example I and II, are to be connected through to the switch elements given the supply of the logic level "1". When, however, they are connected through with the logical level "0", then the signal controlling the switch elements are respectively inverted before the AND operations. Furthermore, it was assumed in the above description of the method execution that the switch elements do not respectively invert the signal they are to connect onto the bus. When, by contrast, such an inversion exists in one of the switch elements, then the appertaining signal to be switched is not inverted, as described, preceding the AND operation which precedes the second gate 71, but, rather, is inverted preceding the AND operation which precedes the first gate 70.

The method of the invention can be simplified in some special instances. When, for example, a switch element affected with a stuck at "1" error which belongs to an input circuit, for example the circuit I or the circuit II, is constantly occupied with a logic signal to be switched, this logic signal corresponding to the signal at the output 8 at which an existing, undefined bus level is imaged as a consequence of a bus conflict, then one of the method segments already suffices for obtaining an output bit pattern deviating from the reference bit pattern which allows a statement regarding the error. If the logical signal constantly pending at the switch element affected with an error were thereby a "0", then the first method segment would suffice for identifying the deviating output bit patterns; if this logical signal were a "1", then the second method segment would suffice.

Although I have described my invention by reference to particular illustrative embodiments thereof, many changes and modifications of the invention may become apparent to those skilled in the art without departing from the spirit and scope of the invention. I therfore intend to include within the patent warranted hereon all such changes and modifications as may reasonably and properly be included within the scope of my contribution to the art.

I claim:

1. A method for simulating an error in a logic circuit which is designed for optionally connecting two logic levels to a bus via at least two input circuits which include switch elements which receive input bit patterns, comprising the steps of:

constructing a simulation model containing an error corresponding to simultaneously connecting both logic levels to the bus, including a logic circuit model, first and second bus model versions which are selectively useable with the logic circuit model;

applying an input bit pattern to the logic circuit model, producing undefined logic level and imaging the undefined logic level to a first logic level with the first bus model version;

applying the input bit pattern to the logic circuit model, producing the undefined logic level and imaging the undefined logic level to a second logic level; and comparing the output bit patterns with error-free reference bit patterns.

2. The method of claim 1, wherein some of the signals of the input bit pattern are logic signals to be switched through to the bus and others of the signals of the input bit pattern are control signals for the switch elements, and wherein:

the step of producing the undefined logic level with the logic circuit model includes
ANDing the logic and control signals, for the first simulated switch element, to produce first signals,
ORing the AND produced first signals to produce a second signal,
inverting the logic signals and ANDing the same with the control signals, for the second simulated switch element, to produce third signals, and
ORing the second signals to produce a fourth signal;

wherein the steps of imaging the undefined logic level includes
applying the second and fourth signals to the first bus model version and logically combining the same to produce a logic output of 0,0,1 for the respective patterns 11,01 and 10 for the second and fourth signals, and
applying the second and fourth signals to the second bus model version and logically combining the same to produce a logic output of 1,0,1 for the respective patterns of 11,01 and 10 of the second and fourth signals.

3. The method of claim 1, wherein some of the signals of the input bit pattern are logic signals to be switched through to the bus and others of the signals of the input bit pattern are control signals for the switch elements, and wherein:

the step of producing the undefined logic level with the logic circuit model includes
inverting the control signals and ANDing the logic and inverted control signals, for the first simulated switch element, to produce first signals,
ORing the AND-produced first signals to produce a second signal,
ANDing the inverted control signals with the logic signals, for the second simulated switch element, to produce third signals, and
ORing the second signals to produce a fourth signal;

wherein the steps of imaging the undefined logic level includes
applying the second and fourth signals to the first bus model version and logically combining the same to produce a predetermined logic output for respective predetermined patterns for the second and fourth signals, and
applying the second and fourth signals to the second bus model version and logically combining the same to produce predetermined logic output for the same respective predetermined patterns of the second and fourth signals.

4. The method of claim 1, wherein some of the signals of the input bit pattern are logic signals to be switched through to the bus and others of the signals of the input bit pattern are control signals for the switch elements, and wherein:

the step of producing the undefined logic level with the logic circuit model includes
inverting the logic signal and ANDing the inverted logic and control signals, for the first simulated switch element, to produce first signals,
ORing the AND produced first signals to produce a second signal,
ANDing the logic signals with the control signals, for the second simulated switch element, to produce third signals, and
ORing the second signals to produce a fourth signal; wherein the steps of imaging the undefined logic level includes
applying the second and fourth signals to the first bus model version and logically combining the same to produce a logic output of 0,0,1 for the respective patterns 11,02 and 10 for the second and fourth signals, and
applying the second and fourth signals to the second bus model version and logically combining the same to produce a logic output of 1,0,1 for the respective patterns of 11,01 and 10 of the second and fourth signals.

5. A method for simulating an error in a logic circuit which is designed for optionally connecting two logic levels to a bus via at least two input circuits which include switch elements which receive input bit patterns, comprising the steps of:

constructing a simulation model containing an error corresponding to simultaneously connecting both logic levels to the bus, including a logic circuit model, and a bus model version which is useable with the logic circuit model;

applying an input bit pattern to the logic circuit model, producing undefined logic level and imaging the undefined logic level to a first logic level with the first bus model version; and comparing the output bit patterns with error-free reference bit patterns in order to determine constant application of a logic level by a switch element.

6. A simulation circuit arrangement for simulating an error in a logic circuit which is designed to optionally connect two logic levels to a bus via an input circuit, comprising switch elements connected to the bus, for receiving input bit patterns including control signals and logic signals to be switched through to the bus, said simulation circuit arrangement comprising:

a simulation model including an input circuit simulation model and a bus circuit simulation model connected to said input circuit simulation model;

said input circuit simulation model including an input for receiving the input bit pattern, and an output, and operable in response to the input bit pattern to produce an undefined logic level at said output; and said bus circuit simulation model including an input connected to said output of said input circuit simulation model, and an output, and operable to image the undefined logic level to a defined logic level at its output.

7. The simulation circuit arrangement of claim 6, wherein, for simulation of each switch element, said input circuit simulation model comprises:

first and second AND gates each including an input for receiving a respective logic signal, an input for receiving a respective control signal and an output;

first and second OR gates each including an input respectively connected to said outputs of said AND gates, and an output connected to said bus circuit simulation model; and an inverter connected to the logic signal input of said second AND gate for inverting the respective logic signal.

8. The simulation circuit arrangement of claim 6, wherein for each switch element of the simulated circuit which is to connect its logic signal to the bus in inverted form, said input circuit simulation model comprises:

first and second AND gates each including an input for receiving a respective logic signal, an input for receiving a respective control signal, and an output;

first and second inverters connected to the respective logic signal inputs of said first and second AND gates to receive and invert the respective logic signals;

first and second OR gates each including an input connected to the respective outputs of said first and second AND gates, and an output connected to said bus circuit simulation model.

9. The simulation circuit arrangement of claim 6, wherein for each switch element of the simulated circuit which is to connect a first logic level in response to receipt of a second logic level, said input circuit simulation model comprises:

inverter means connected to receive and invert respective signals of the input bit pattern.

10. The simulation circuit arrangement of claim 6, wherein, for each switch element of the simulated circuit which has a logic signal input and two separate selection inputs which receive mutually inverse control signals, said input circuit simulation model comprises:

a first inverter connected to receive one of the control signals;

a first OR gate including a first input for receiving the other control signal, a second input connected to said inverter;

a second inverter connected to receive the logic signal;

first and second AND gates each including a first input, a second input and an output, said first inputs connected to said output of said OR gate, second input of said first AND gate connected to receive the logic signal, and said second input of said second AND gate connected to second inverter; and third and fourth OR gates each including an input respectively connected to said outputs of said first and second AND gates, and an output connected to said bus circuit simulation model.

11. The simulation circuit arrangement of claim 6, wherein each switch element of the simulated circuit which is composed of a series connection of two p-channel field effect transistors and two n-channel field effect transistors between a supply potential and a reference potential, and in which the gates of the intermediate p-channel and n-channel transistors of the series are commonly connected to receive the logic signal and their commonly connected source-drain connection serves as an output to the bus, and in which gates of the remaining p-channel and n-channel transistors respectively receive control signals, said input circuit simulation model comprises:

a first inverter connected to receive one of the control signals;

a second inverter connected to receive the logic signal;

first and second AND gates each including first and second inputs and an output;

said first and second inputs of said first AND gate respectively connected to said first and second inverters;

said first input of said second AND gate connected to receive the other of the control signals;

said second input of said second AND gate connected to receive the logic signal; and first and second OR gates each including an input respectively connected to said outputs of said AND gates and an output connected to said bus circuit simulation model.

12. The simulation circuit arrangement of claim 6, wherein said bus circuit simulation model comprises:

first and second NOR gates each including first and second inputs, and an output;

said first input of each of said NOR gates cross-coupled to the respective output of the other NOR gate; and said second inputs connected to said input circuit simulation model.

13. The simulation circuit arrangement of claim 6, wherein said bus circuit simulation model comprises:

an AND gate including an inverting input and a non-inverting input each connected to said input circuit simulation model, and an output.

14. The simulation circuit of claim 6, wherein said bus circuit simulation model comprises:

a first input connected to said input circuit simulation model to operate in a no-load situation;

a second input;

an output; and an inverter connected between said second input and said output.

15. The simulation circuit of claim 6, wherein said bus circuit simulation model comprises:

first and second NOR gates each including first and second inputs and an output;

said first inputs connected to said input circuit simulation model, and said second inputs cross-connected to the opposite respective outputs; and an inverter connected to the output of said first NOR gate to form the output of said bus circuit simulation model.

16. The simulation circuit of claim 6, wherein said bus circuit simulation model comprises:
   a first input and an output directly connected together and to said input circuit simulation model; and
   a second input connected to said input circuit simulation model and operated in a no-load condition.

17. The simulation circuit of claim 6, wherein said bus circuit simulation model comprises:
   a NAND gate including an inverting input connected to said input circuit simulation model;
   a non-inverting input connected to said input circuit simulation model; and
   an output providing the imaged signal.

* * * * *